United States Patent
Yamakado (10) Patent No.: US 7,973,976 B2
(45) Date of Patent: Jul. 5, 2011

(54) DITHER MATRIX GENERATOR, PRINT PRODUCT, METHOD FOR GENERATING A DITHER MATRIX, PROGRAM PRODUCT, AND IMAGE PROCESSING DEVICE

(75) Inventor: Hitoshi Yamakado, Hino (JP)

(73) Assignee: Seiko Epson Corporation (JP)

( * ) Notice: Subject to any disclaimer, the term of this patent is extended or adjusted under 35 U.S.C. 154(b) by 681 days.

(21) Appl. No.: 11/471,306

(22) Filed: Jun. 20, 2006

(65) Prior Publication Data

US 2007/0019241 A1    Jan. 25, 2007

(30) Foreign Application Priority Data

Jul. 21, 2005   (JP) ................... 2005-211214

(51) Int. Cl.
*G06K 15/00* (2006.01)
*H04N 1/40* (2006.01)

(52) U.S. Cl. ............ 358/3.13; 358/3.14; 358/448

(58) Field of Classification Search ............. 358/3.13, 358/502, 448, 3.14, 300, 465; 382/253, 169, 382/232, 237, 205, 260; 341/200
See application file for complete search history.

(56) References Cited

U.S. PATENT DOCUMENTS

| | | |
|---|---|---|
| 5,535,020 A | 7/1996 | Ulichney |
| 5,745,259 A | 4/1998 | Ulichney |
| 5,912,745 A | 6/1999 | Ulichney |
| 5,917,951 A * | 6/1999 | Thompson et al. ........... 382/237 |
| 6,172,733 B1 | 1/2001 | Hong et al. |
| 6,817,721 B1 | 11/2004 | Ulichney et al. |
| 6,842,184 B2 * | 1/2005 | Huang et al. ................. 345/596 |
| 6,943,814 B2 | 9/2005 | Iioka et al. |

(Continued)

FOREIGN PATENT DOCUMENTS

JP   10-210292   8/1998

(Continued)

OTHER PUBLICATIONS

Communication from PCT re: related application. *One or more of the English translation documents submitted herewith may be Abstracts only or partial machine created translations from the Japanese Patent Office. As such, the submitter does not necessarily vouch for their accuracy. Additional information may be obtained from the Japanese Patent Office web site at www.ipo.cio.ip.

*Primary Examiner* — Benny Q Tieu
*Assistant Examiner* — Ngon Nguyen
(74) *Attorney, Agent, or Firm* — Harness, Dickey & Pierce, P.L.C.

(57) ABSTRACT

A dither matrix generator includes: a main-cluster generator that generates at least one main-cluster in a matrix, the matrix including a plurality of cells, the main cluster area including a predetermined number of cells; a sparest searcher that searches a sparest area in the matrix, the sparest area being the area other than the area of main-cluster; a sub-cluster generator that generates at least one sub-cluster area, the sub-cluster area including a smaller number of cells than that of the main-cluster; a dither value allocator that allocates dither values to the plurality of cells of the matrix, the cells in the main-clusters having smaller dither values than those in the sub-cluster areas, the cells in the sub-cluster areas having smaller dither values than those in the areas other than the main-cluster and the sub-cluster areas.

10 Claims, 9 Drawing Sheets

U.S. PATENT DOCUMENTS

| | | |
|---|---|---|
| 2003/0058482 A1 | 3/2003 | Morimatsu |
| 2006/0181739 A1 | 8/2006 | Yamakado |

FOREIGN PATENT DOCUMENTS

| | | |
|---|---|---|
| JP | 11-177821 | 7/1999 |
| JP | 2001-177722 | 6/2001 |
| JP | 2001-326817 | 11/2001 |
| JP | 2002-044446 | 2/2002 |
| JP | 2003-125201 | 4/2003 |
| JP | 2004-531982 | 10/2004 |
| WO | WO 03/001790 | 1/2003 |

* cited by examiner

| 14 | 13 |   |   |    |    |    |   |
|----|----|---|---|----|----|----|---|
| 5  | 6  |   |   | 12 | 11 |    |   |
|    |    |   |   | 3  | 4  |    |   |
|    |    |   |   |    |    |    |   |
|    |    |   |   |    |    |    |   |
|    | 16 | 15|   |    |    |    |   |
|    | 7  | 8 |   |    |    | 10 | 9 |
|    |    |   |   |    |    | 1  | 2 |

*FIG. 14*

| 14 | 13 |   |   |    |    |    |    |
|----|----|---|---|----|----|----|----|
| 5  | 6  |   |   | 12 | 11 |    |    |
|    |    |   |   | 3  | 4  |    | 18 |
|    |    |   |   |    |    |    | 20 |
|    |    |   |   |    |    |    |    |
|    | 16 | 15|   | 19 |    |    |    |
|    | 7  | 8 |   | 17 |    | 10 | 9  |
|    |    |   |   |    |    | 1  | 2  |

*FIG. 15*

| 14 | 13 | 55 | 19 | 49 | 53 | 40 | 63 |
|----|----|----|----|----|----|----|----|
| 5  | 6  | 36 | 61 | 12 | 11 | 59 | 24 |
| 51 | 21 | 48 | 42 | 3  | 4  | 47 | 18 |
| 26 | 33 | 57 | 30 | 29 | 34 | 35 | 20 |
| 50 | 54 | 39 | 64 | 52 | 31 | 56 | 41 |
| 25 | 16 | 15 | 28 | 19 | 60 | 32 | 62 |
| 37 | 7  | 8  | 46 | 17 | 43 | 10 | 9  |
| 58 | 44 | 22 | 17 | 38 | 27 | 1  | 2  |

DITHER MATRIX GENERATOR, PRINT PRODUCT, METHOD FOR GENERATING A DITHER MATRIX, PROGRAM PRODUCT, AND IMAGE PROCESSING DEVICE

The entire disclosure of Japanese Patent Application No. 2005-211214, filed on Jul. 21, 2005 is expressly incorporated by reference herein.

BACKGROUND

1. Technical Field

The present invention relates to image processing capable of preventing so-called "banding".

2. Related Art

An image forming device having an ink ejecting mechanism, such as an ink jet printer, has a plurality of nozzles for ejecting an ink dot in a droplet form, so as to perform high-speed printing. The nozzles are mounted on a printing head. An ink jet printer causes the printing heads to eject ink dots by moving a sheet of paper (or a print media) in a sheet feeding direction and moving the printing heads repeatedly in a direction orthogonal to the sheet feeding direction, thereby forms images on the paper. This kind of printer is referred to as a "multi-pass printer". The printing speed of a multi-pass printer is restricted since the multi-pass printer needs a two-directional scan. Therefore, an improvement in printing speed is required.

Reducing the scan dimension into a one-dimensional scan, for example, scanning only in a sheet feeding direction, referred to as single-pass printing, is one of the approaches to improve printing speed. It is necessary for single-pass printing to extend the size of a printing head to a width greater than the width of the printing paper. This kind of printer, in other words, a printer having a printing head which is larger than the width of printing paper, is referred to as a "line head printer". In a printing head of a line head printer, it is necessary to layout nozzles at a regular distance from each other on the printing head. However, it is difficult to fabricate a printing head in which the nozzles are laid out at exact intervals, because of fabrication errors. The dispersion of a distance between two adjacent nozzles causes the actual position of an ink dot formed on printing paper to be different from an ideal position. Furthermore, a skew of a nozzle also causes the actual position of an ink dot formed on printing paper to be different from an ideal position. The phenomenon of causing a difference between the ideal position and the actual position, is called "splash bending". In a single-pass printer such as a line head printer, the phenomenon of splash bending causes white bands or dark bands to appear on the print product. The white band appears where a distance between two adjacent nozzles is greater than the ideal distance, and the dark band appears where a distance between two adjacent nozzles is less than the ideal distance. This phenomenon is referred to as "banding".

JP-T-2004-531982 discloses an approach to prevent banding. JP-T-2004-531982 discloses binarization using a dither matrix that has characteristics of both so-called "clustered dither matrix" and "dispersed dither matrix". According to JP-T-2004-531982, dot seeds are randomly laid-out in a dither matrix and dot clusters grow around the dot seeds.

SUMMARY

According to JP-T-2004-531982, a dither matrix is designed to grow dot clusters around the dot seeds. Thus, an image formed using the dither matrix gives rise to a problem, in that the clustered dots are insistent. In other words, the image has poor quality in view of granularity.

An advantage of some aspects of the invention is to provide a method for generating a dither matrix by which an image having good balance of granularity and anti-banding characteristics can be formed, and technology of image forming using the dither matrix.

According to an aspect of the invention, a dither matrix generator includes: a main-cluster generator that generates at least one main-cluster in a matrix, the matrix including a plurality of cells, the main cluster area including a predetermined number of cells; a sparest searcher that searches a sparest area in the matrix, the sparest area being the area other than the area of main-cluster; a sub-cluster generator that generates at least one sub-cluster area, the sub-cluster area including a smaller number of cells than that of the main-cluster; a dither value allocator that allocates dither values to the plurality of cells of the matrix, the cells in the main-clusters having smaller dither values than those in the sub-cluster areas, the cells in the sub-cluster areas having smaller dither values than those in the areas other than the main-cluster and the sub-cluster areas.

It is preferable that the main-cluster generator generate the main-clusters so that the main-clusters are laid-out as a blue noise pattern.

It is preferable that the sub-cluster generator generates the sub-cluster areas so that the sub-clusters are laid-out as a blue noise pattern.

It is preferable that the dither matrix generator further includes: a max-sparest searcher that searches a max-sparest area among the sparest areas, the max-sparest area having the maximum size among the sparest areas, wherein the dither value allocator allocates the maximum dither value at that time to the center cell of the max-sparest area.

According to another aspect of the invention, a print product is printed in accordance with image data processed using a dither matrix generated by a dither matrix generator. The dither matrix generator includes: a main-cluster generator that generates at least one main-cluster in a matrix, the matrix including a plurality of cells, the main cluster area including a predetermined number of cells; a sparest searcher that searches a sparest area in the matrix, the sparest area being the area other than that of the main-clusters; a sub-cluster generator that generates at least one sub-cluster area, the sub-cluster area including a smaller number of cells than the main-cluster; a dither value allocator that allocates dither values to the plurality of cells of the matrix, the cells in the main-clusters having smaller dither values than those in the sub-cluster areas, the cells in the sub-cluster areas having smaller dither values than those in the areas other than the main-cluster and the sub-cluster areas.

According to further aspect of the invention, a method for generating a dither matrix includes: generating at least one main-cluster in a matrix, the matrix including a plurality of cells, the main cluster area including a predetermined number of cells; searching a sparest area in the matrix, the sparest area being the area other than that of the main-cluster; generating at least one sub-cluster area, the sub-cluster area including a smaller number of cells than the main-cluster; allocating dither values to the plurality of cells of the matrix, the cells in the main-clusters having smaller dither values than those in the sub-cluster areas, the cells in the sub-cluster areas having smaller dither values than those in the areas other than the main-cluster and the sub-cluster areas.

According to yet further aspect of the invention, A program product causes a computer device to execute: generating at least one main-cluster in a matrix, the matrix including a plurality of cells, the main cluster area including a predetermined number of cells; searching a sparest area in the matrix, the sparest area being the area other than that of the main-cluster; generating at least one sub-cluster area, the sub-cluster area including a smaller number of cells than the main-cluster; allocating dither values to the plurality of cells of the matrix, the cells in the main-clusters having smaller dither values than those in the sub-cluster areas, the cells in the sub-cluster areas having smaller dither values than those in the areas other than the main-cluster and the sub-cluster areas.

According to yet further aspect of the invention, an image processing device includes: a memory that stores a dither matrix, the matrix including a plurality of cells, each of the cells having a dither value; a quantizer that quantizes image data using the dither matrix stored in the memory; and an output device that outputs the image data quantized by the quantizer; wherein the dither matrix includes clustered dither areas and dispersed dither areas, the clustered dither areas having main-clusters and a sub-cluster area, the sub-cluster area having a size smaller than that of the main-clusters, cells in the main-clusters having smaller dither values than those in the sub-cluster areas, the cells in the sub-cluster areas having smaller dither values than those in the areas other than the main-cluster and the sub-cluster areas.

It is preferable that the main-cluster generator generates the main-clusters so that the main-clusters are laid-out as a blue noise pattern.

It is preferable that the sub-cluster generator generates the sub-cluster areas so that the sub-clusters are laid-out as a blue noise pattern.

DESCRIPTION OF EXEMPLARY EMBODIMENTS

1. Outline

First, "Hybrid Dither Matrix with Sub-cluster" (hereinafter referred to as "HDMS") will be described. The HDMS is a dither matrix having characteristics of both clustered dither matrix and dispersed dither matrix. Generally, a dither matrix is used in image processing for an image forming system, especially in binarization (or quatization). In a dither matrix, each cell has a dither value that acts as a threshold for the binarization. The image data includes a plurality of pixels. Each pixel has a pixel value that shows a tone (or a gradation) of the pixel. The image data is binarized by comparing a pixel value with a corresponding cell of the dither matrix.

Figure 1:
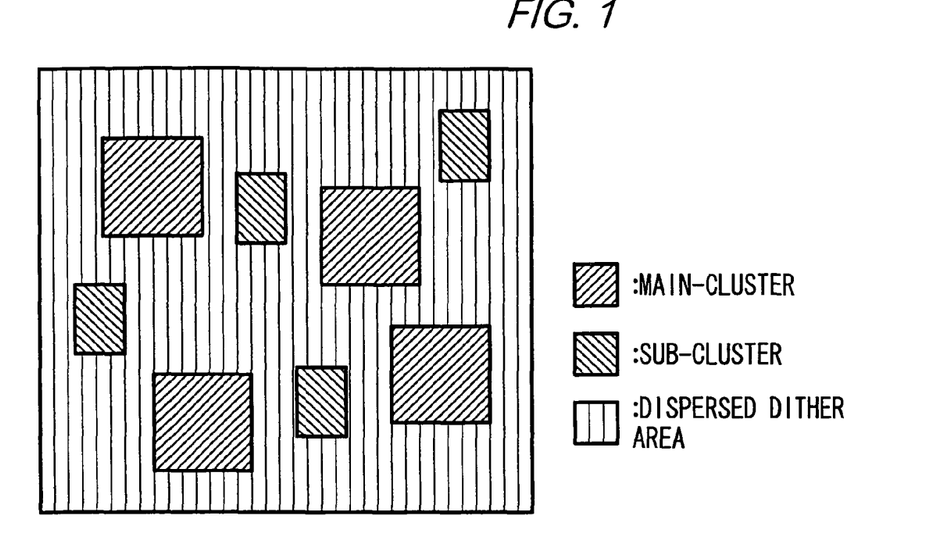
FIG. 1 is an outline of a Hybrid Dither Matrix with Sub-cluster in accordance with one embodiment of the invention.

FIG. 1 shows an outline of HDMS in accordance with one embodiment of the invention. The HDMS includes a plurality of cells, laid-out as an M×N cell matrix. The HDMS has a clustered dot area and a dispersed dot area. In the following descriptions, the term "dot" is also used for identifying which area a cell belongs to. A dot and a cell correspond to one another. The clustered dot area includes at least one main-cluster and one sub-cluster. In a HDMS, the main-clusters are laid-out as, for example, a blue noise pattern. The sub-clusters provide a smooth connection between two main-clusters. The size of a sub-cluster is smaller than that of a main-cluster. In other words, a sub-cluster includes smaller number of cells than the main-cluster. In the HDMS, the area other than the clustered dots area is the dispersed dots area. In the dispersed dot area, dither values are allocated in accordance with, for example, a blue noise pattern.

2. Generating HDMS

Prior to describing a method for generating a HDMS, definitions for terms and parameters are given as follow.

A. dither size DS shows a number of cells of a side of a HDMS, in other words, the dither size DS shows the size of the HDMS. For example, in a case of DS=8, the HDMS has a size of 8 cells×8 cells.

B. main-cluster number NC shows a number of main-clusters, in other words, a number of product nuclei, in a HDMS. The main-cluster number NC equals to a number of ON dots in an initial binary pattern.

C. peripheral dot number NP shows a number of ON dots corresponding to one product nucleus. For example, in a case of NP=3, a main-cluster includes four dots including three peripheral dots and a product nucleus.

D. sub-cluster number NS shows a number of sub-clusters in a HDMS.

E. sub-cluster size SS shows a number of dots included in a sub-cluster.

F. "ON dot" is a dot having a value of "1". "OFF dot" is a dot having a value of "0".

G. product nucleus is an ON dot (or a cell) that gives a position or layout in a HDMS, of a main-cluster. A main-cluster includes one product nucleus and at least one peripheral dot. The peripheral dots are laid-out around the product nucleus. It is to be noted that the product nucleus may not be located at the center of the main-cluster.

H. "growth" of a main-cluster means to layout peripheral dots around a corresponding product nucleus.

Figure 2:
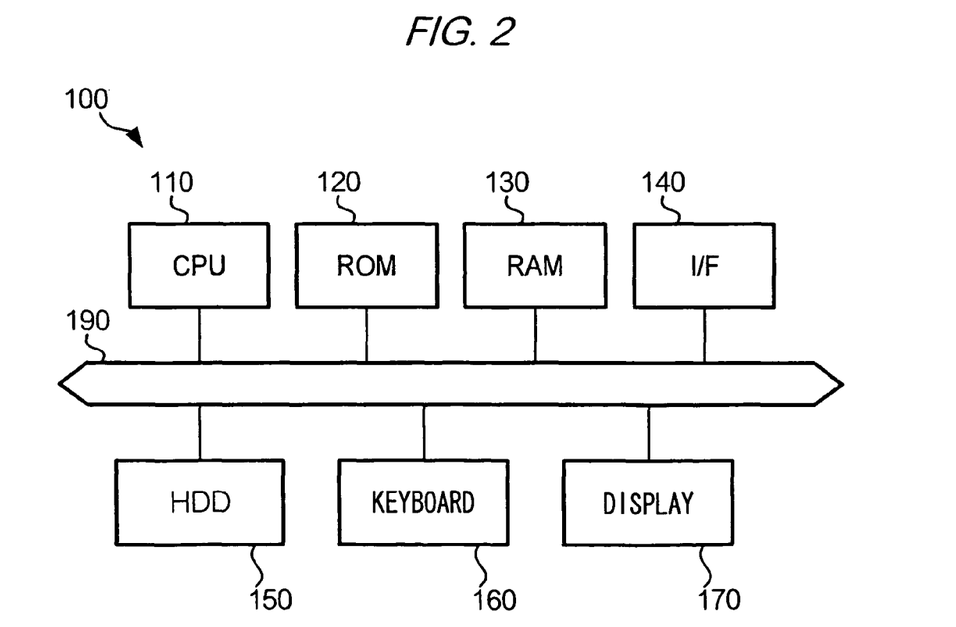
FIG. 2 is a block diagram illustrating a hardware configuration of a personal computer as an example of a dither matrix generator in accordance with one embodiment of the invention.

FIG. 2 shows a block diagram illustrating a hardware configuration of a PC (Personal Computer) 100. The PC 100 is an example of a dither matrix generator in accordance with one embodiment of the invention. A ROM (Read Only Memory) 120 and a HDD (Hard Disk Drive) 150 are storage devices for storing various programs and data. In the present embodiment, the HDD 150 stores a HDMS generating program for generating a HDMS. A CPU (Central Processing Unit) 110 functions as a controller that controls the elements of the PC 100, by executing a program stored in the ROM 120 or the HDD 150. A RAM (random access memory) 130 functions as a work area of the CPU 110. An I/F 140 is an interface for inputting and outputting data or signals with other devices. The above elements are connected via a bus 190.

Figure 3:
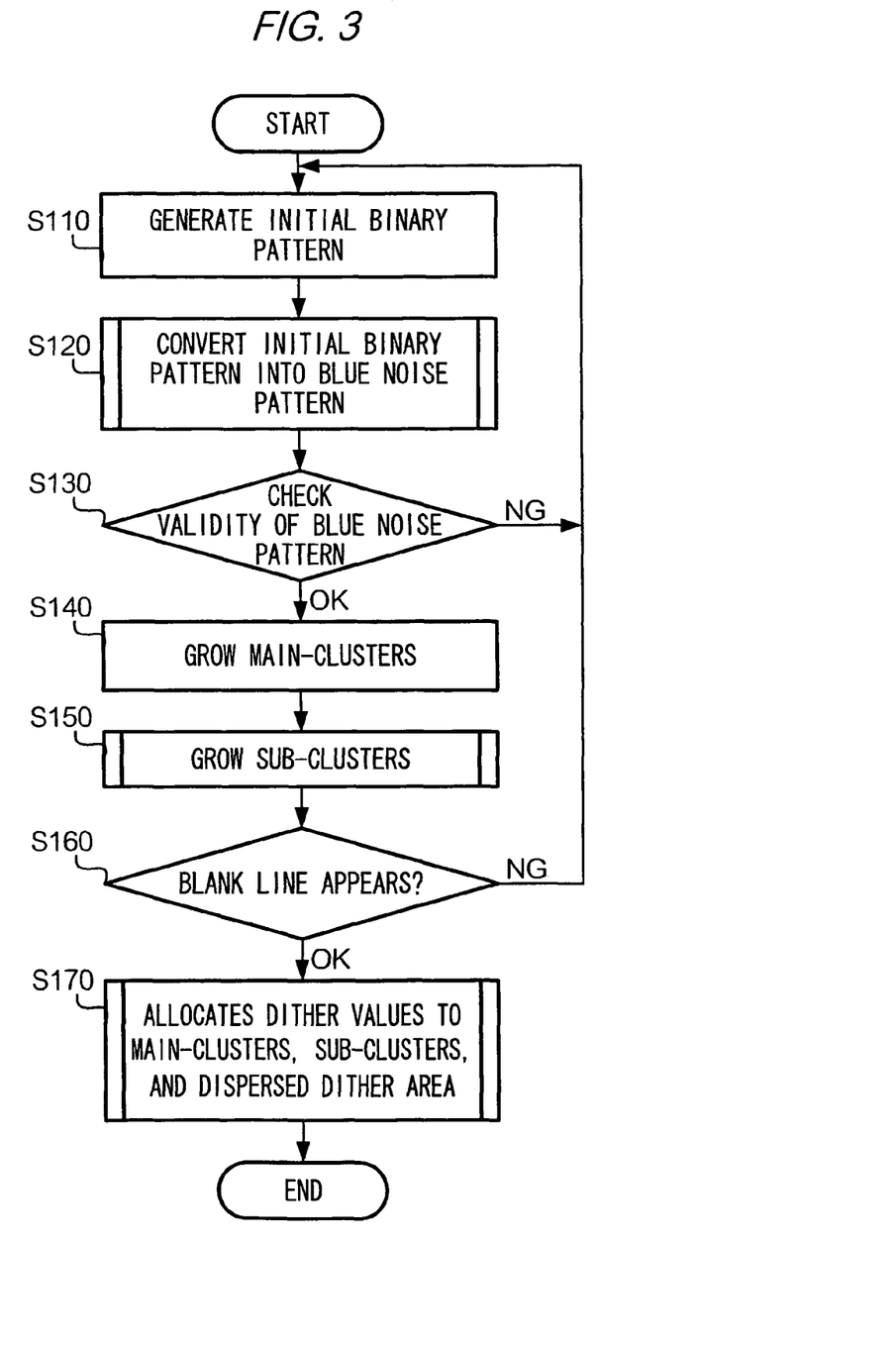
FIG. 3 is a flowchart illustrating operations for generating a Hybrid Dither Matrix with Sub-cluster in accordance with one embodiment of the invention.

FIG. 3 shows a flowchart illustrating operations for generating a HDMS in accordance with the present embodiment. In step S110, the CPU 110 of the PC 100 generates an initial binary pattern. The initial binary pattern is generated using dither size DS, main-cluster number NC, and random number.

Figure 4:
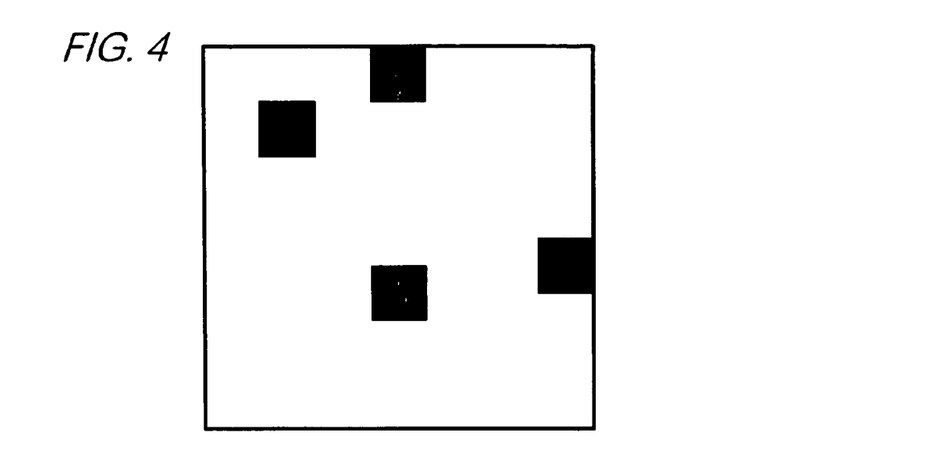
FIG. 4 illustrates an example of an initial binary pattern in accordance with one embodiment of the invention.

FIG. 4 shows an example of an initial binary pattern. The initial pattern includes a plurality of dots, each of which has a dot value of "0" or "1". FIG. 4 shows an example of dither size DS=8 and main-cluster number NC=4. The initial pattern includes at least one product nucleus (or ON dot). In the initial binary pattern, product nuclei are shown in black dots (ON dots) and the other areas are shown in white dots (OFF dots). A user of the PC 100 can arbitrarily design the value of main-cluster number NC. It is preferable that the main-cluster number NC increases with the increase in the dither size DS.

Referring to FIG. 3 again, in step S120, the CPU 110 converts the initial binary pattern into a blue noise pattern. The conversion is performed as follows. First, the CPU 110 determines the densest area and the sparsest area. Generally, the densest area is an area in which the density of the product nuclei (or ON dots) is the highest. The sparsest area is an area in which the density of the product nuclei is the lowest. Next, the CPU 110 replaces the ON dot of the densest area by the OFF dot of the sparsest area. The CPU 110 repeats the exchange until a predetermined convergence condition is satisfied.

Figure 5:
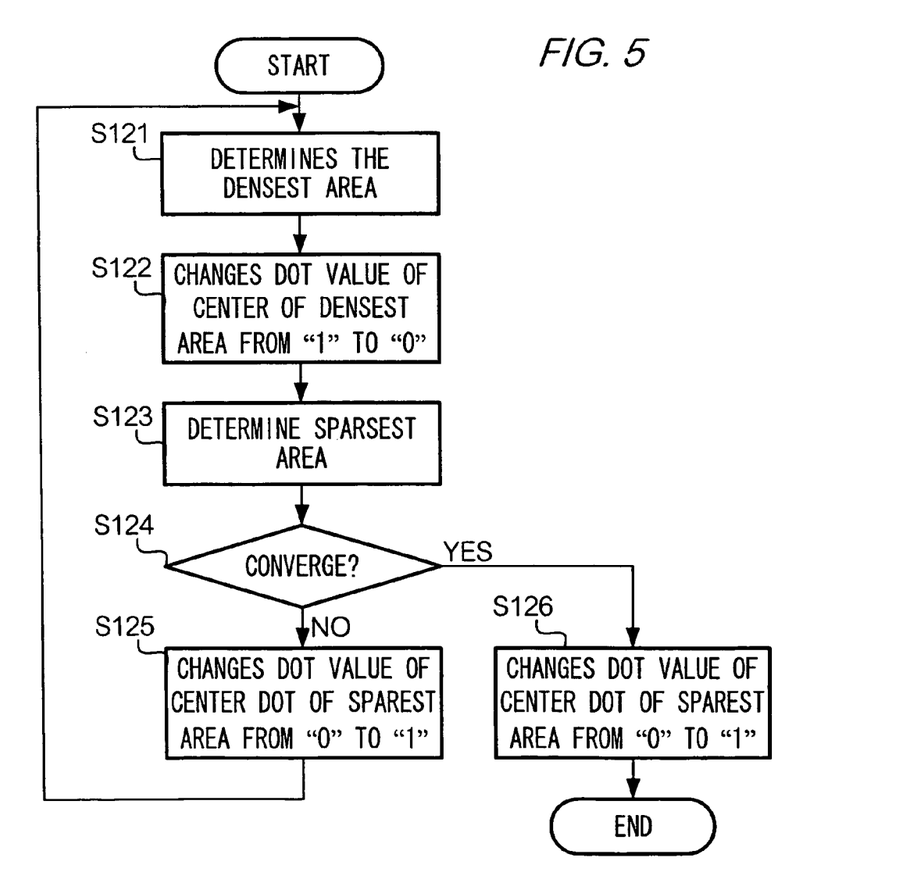
FIG. 5 is a flowchart illustrating the details of the conversion of the initial binary pattern into a blue noise pattern in accordance with one embodiment of the invention.

FIG. 5 shows a flowchart illustrating the details of the conversion of the initial binary pattern into a blue noise pattern in step S120. In step S121, the CPU 110 determines the densest area in the HDMS. In step S122, the CPU 110 stores in RAM 130 the coordinates of the center dot of the densest area. Then, the CPU 110 changes the dot value of the center of the densest area from "1" to "0". In step S123, the CPU 110 determines the sparsest area in HDMS. In step S124, the CPU 110 stores in RAM 130 the coordinates of the center cell of the sparsest area. Then, the CPU 110 determines whether the center cell of the sparsest area satisfies a predetermined convergence condition. In the present embodiment, a condition that the coordinates of the center cell of the densest area found in S121 are the same as those of the sparsest area found in S123, is employed as the convergence condition. When the convergence condition is not satisfied (in step S124: NO), in step S125, the CPU 110 changes the dot value of the center dot of the sparest area from "0" to "1". The CPU 110 repeats the operations in steps S121-S125 until the convergence condition is satisfied. When the convergence condition is satisfied (in step S124: YES), in step S126, the CPU 110 changes the dot value of the center dot of the sparest area from "0" to "1". Then, the CPU 110 terminates the operations shown in FIG. 5. The CPU 110 stores in HDD 150 the generated matrix (or the generated pattern), the blue noise pattern.

Well known algorithms may be used as searching algorithms in steps S121 and S123. For example, a method using a convolution filter in accordance with a Gaussian filter, may be used in the present embodiment. The Gaussian filter is described in detail by R. Ulichney, "The void-and-cluster method for dither array generation", Human Vision, Visual Processing, and Digital Display IV, J. Allebach and B. Rogowitz, eds., Proc. SPIE 1913, pp. 332-343, 1993.

A blue noise pattern matrix BN (x, y) is given as the following equation (1).

$$BN(x, y) = \sum_{p=-M/2}^{M/2} \sum_{q=-N/2}^{N/2} BP(p', q') f(p, q) \quad (1)$$

Here, p'=(M+x−p) mod M and q'=(M+x−q) mod N. M and N indicates a size of a matrix. BP(x, y) indicates a matrix of the initial binary pattern. ƒ(x, y) is a filter function.

As the filter function ƒ(x, y), a function shown in the following equation (2) may be used. In equation (2), the right side shows a two-dimensional Gaussian filter function and the left side shows a filter function simplified by using symmetry of the two-dimensional Gaussian filter function.

$$e^{-\frac{x^2}{2\sigma_x^2} - \frac{y^2}{2\sigma_y^2}} \Rightarrow e^{-\frac{r^2}{2\sigma^2}} \quad (2)$$

Here, r and σ are defined by $r^2 = x^2 + y^2$ and $\sigma = \sigma_x + \sigma_y$. It is known that σ satisfies approximately 1.0<σ<1.5 in the blue noise pattern (see the above reference Ulichney and R. Ulichney, "Filter Design for Void-and-Cluster Arrays", Soc. For Information Display International Symposium Digest of Tech. Papers, vol. 25, San Jose, Calif., Jun. 14-16, pp. 809-812, 1994. Therefore, in the present embodiment, σ=1.5 is employed, for example.

Referring to FIG. 3 again, in step S130, the CPU 110 checks the validity (or acceptability) of the generated blue noise pattern. In the present embodiment, the CPU 110 determines whether the following conditions are satisfied, for the validity check. The conditions are: (1) The main-cluster after growth is not divided by the edge of the HDMS, in other words, the main-cluster after growth is within the HDMS; and (2) No two product nuclei have the same x coordinate or y coordinate.

As will be described later, a plurality of HDMSs are laid-out by shifting two adjacent HDMSs in the x direction or y direction. Therefore, the condition (1) is a condition to prevent dividing the main-cluster by the edge of the HDMS. If the main-cluster is divided, it functions no longer as a "cluster". Furthermore, in the image processing, a single HDMS is used repeatedly. Therefore, if two product nuclei have the same x coordinate, the banding appears in the x direction after binarization. The condition (2) is a condition to prevent appearance of banding.

Figure 6:
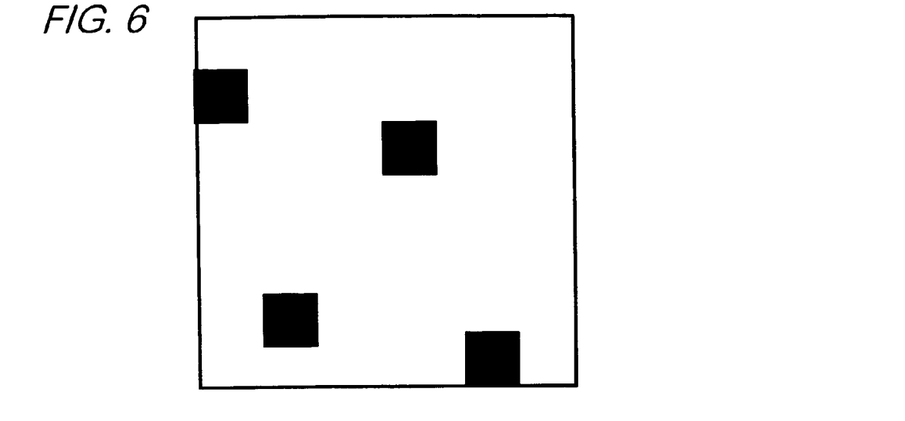
FIG. 6 illustrates an example of a blue noise pattern that passes a validity check in accordance with one embodiment of the invention.

FIG. 6 shows an example of a blue noise pattern that passes the validity check. It is to be noted that the printing head extends vertically in the drawings, and a paper is fed horizontally. The relations are similar in other drawings, for example in FIGS. 7 and 9.

Referring to FIG. 3 again, in step S140, the CPU 110 grows main-clusters.

Figure 7:
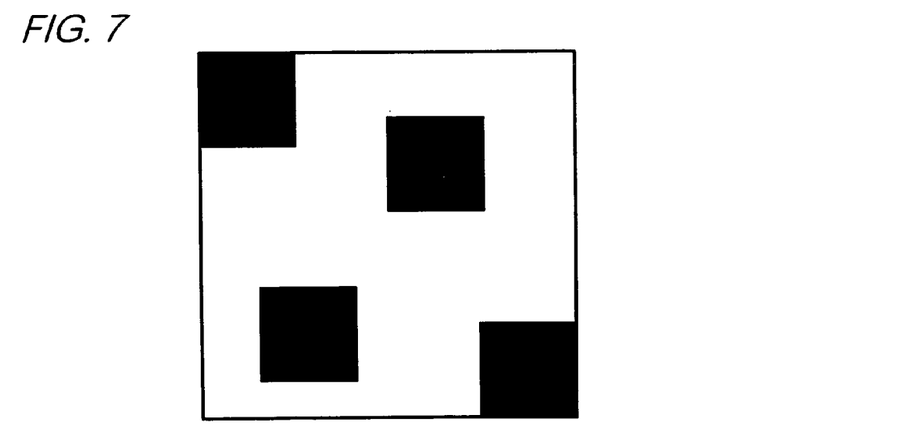
FIG. 7 is a pattern after the main-cluster growth based on the blue noise pattern shown in FIG. 6.

FIG. 7 shows a pattern after the main-cluster growth based on the blue noise pattern shown in FIG. 6. FIG. 7 shows an example with peripheral dot number NP=3. In this case, the main-clusters are grown by adding dots at the right neighbor, the up neighbor, and the upper-right neighbor of the product nuclei. The main-cluster includes four dots. Since the blue noise pattern shown in FIG. 6 has passed the validity check, the main-cluster is not divided by the edge of the HDMS. The CPU 110 stores in HDD 150 the generated pattern (hereinafter referred to as "main-cluster pattern").

Referring to FIG. 3 again, in step S150, the CPU 110 generates sub-clusters. The size of the sub-cluster is smaller than that of the main-cluster. In the present embodiment, sub-cluster size SS satisfies SS=2.

Figure 8:
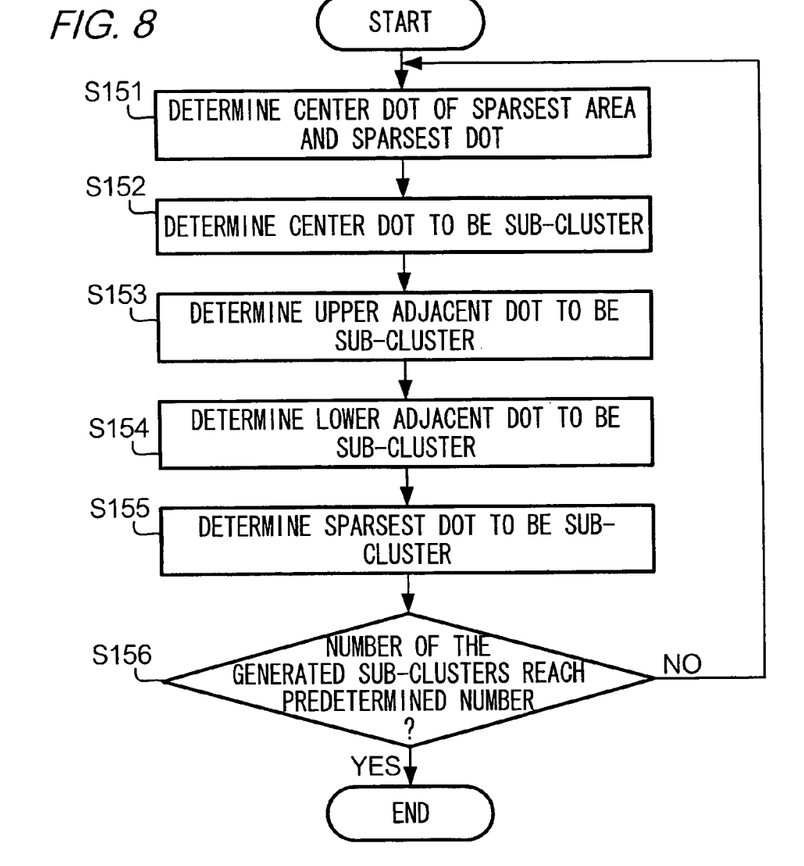
FIG. 8 is a flowchart illustrating the details of operations for generating sub-clusters in accordance with one embodiment of the invention.

FIG. 8 shows a flowchart illustrating details of operations for generating sub-clusters in step S150. The sub-clusters are generated as follows. In step S151, the CPU 110 determines the center dot of a sparsest area and a sparsest dot. The sparsest dot is one of eight dots adjacent to (or neighboring) the center dot of the sparsest area. Also, the sparsest dot is a dot at which the density of ON dots is the lowest. To determine the sparsest area, the algorithm described in generating the blue noise pattern may be used. Next, in step S152, the CPU 110 determines the center dot to be a sub-cluster, in a case that the center dot is not an ON dot. In step S153, the CPU 110 determines the upper adjacent dot to be a sub-cluster, in a case that the center dot is an ON dot and the upper adjacent dot is not an ON dot. In step S154, the CPU 110 determines the lower adjacent dot to be a sub-cluster, in a case that both of the center dot and the up adjacent dot are ON dots, and the low adjacent dot is not an ON dot. In step S155, the CPU 110 determines the sparsest dot to be a sub-cluster, in a case that all of the center dot, the upper adjacent dot, and the lower adjacent dot are ON dots. In step S156, the CPU 110 determines whether the number of the generated sub-clusters reaches a predetermined number NS. When the number of the generated sub-clusters is below the predetermined number NS (in step S156: NO), the CPU 110 repeats the operations in steps S151-S155. When the number of the generated sub-clusters equals to the predetermined number NS (in step S156: YES), the CPU 110 terminates the operations shown in FIG. 8. The CPU 110 stores in HDD150 the generated pattern (hereinafter referred to as "sub-cluster pattern").

Figure 9:
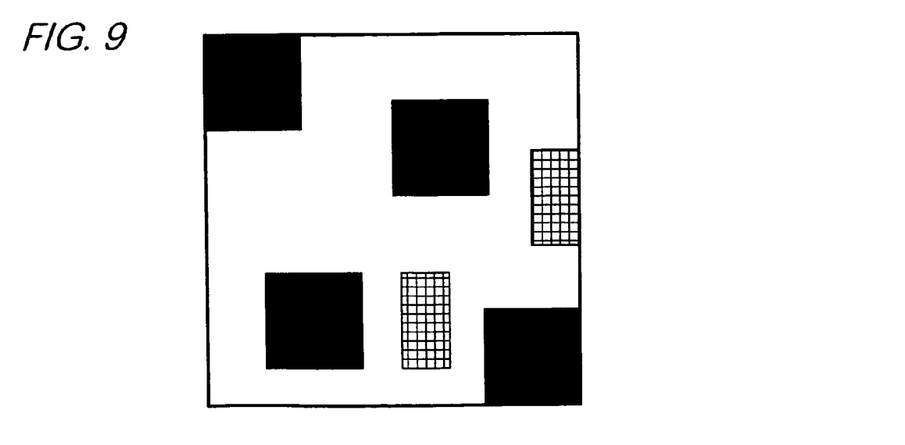
FIG. 9 illustrates an example of the generated sub-cluster pattern in accordance with one embodiment of the invention.

FIG. 9 shows an example of the generated sub-cluster pattern. In the above description, the upper adjacent dot and the lower adjacent dot have the highest and the second highest priorities to be a sub-cluster. The order of the determination of a sub-cluster is intended to break the banding.

In other words, the direction of sub-clusters is orthogonal to the direction of banding (equal to the sheet feeding direction). Therefore, the direction of sub-clusters may be determined in response to the sheet feeding direction of a printer.

Referring to FIG. 3 again, in step S160, the CPU 160 determines whether a blank line appears in the generated pattern. The "blank line" is a line in a matrix, including no ON dot (no main-cluster or no sub-cluster). If the direction of the blank line equals to the banding direction, there increases a possibility that the banding becomes conspicuous. The blank line check is preformed to prevent the banding direction and the blank line direction coinciding. It is to be noted that the blank line check may be performed for the banding direction (or sheet feeding direction).

When the sub-cluster pattern does not pass the blank line check (in step S160: NG), the CPU 110 generates another initial binary pattern (in step S110), and repeats the operations in steps S110-S150.

When the sub-cluster pattern passes the blank line check (in step S160: OK), in step S170, the CPU 110 allocates dither values to the main-clusters, the sub-clusters, and the other area (referred to as "dispersed dither area").

Figure 10:
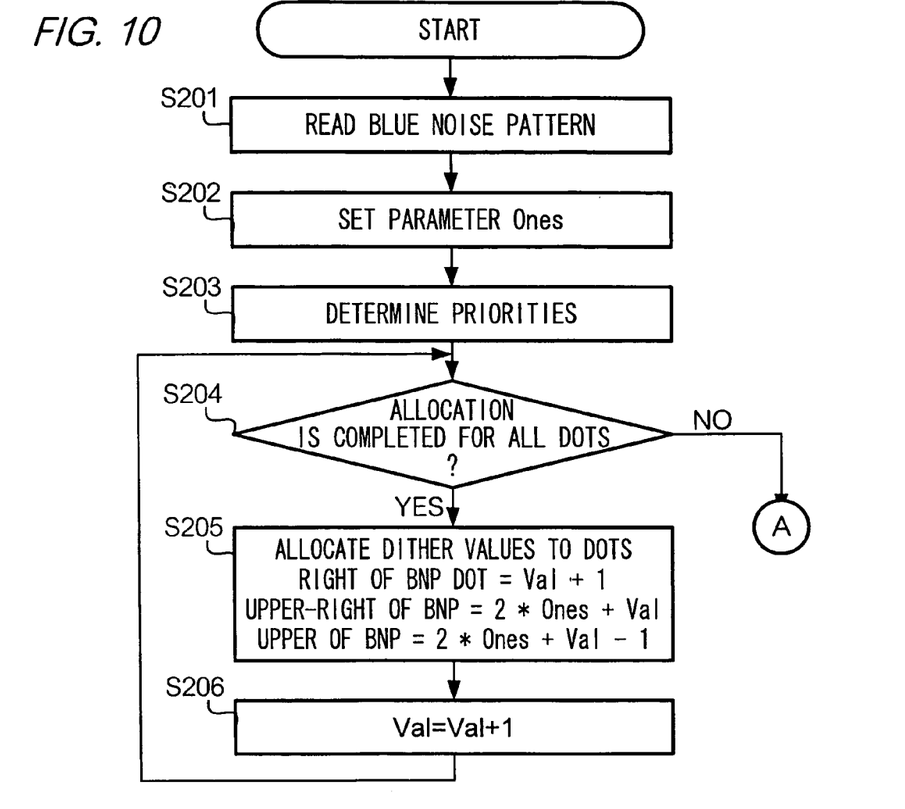
FIG. 10 is a flowchart showing the details of allocating dither values in accordance with one embodiment of the invention.
Figure 11:
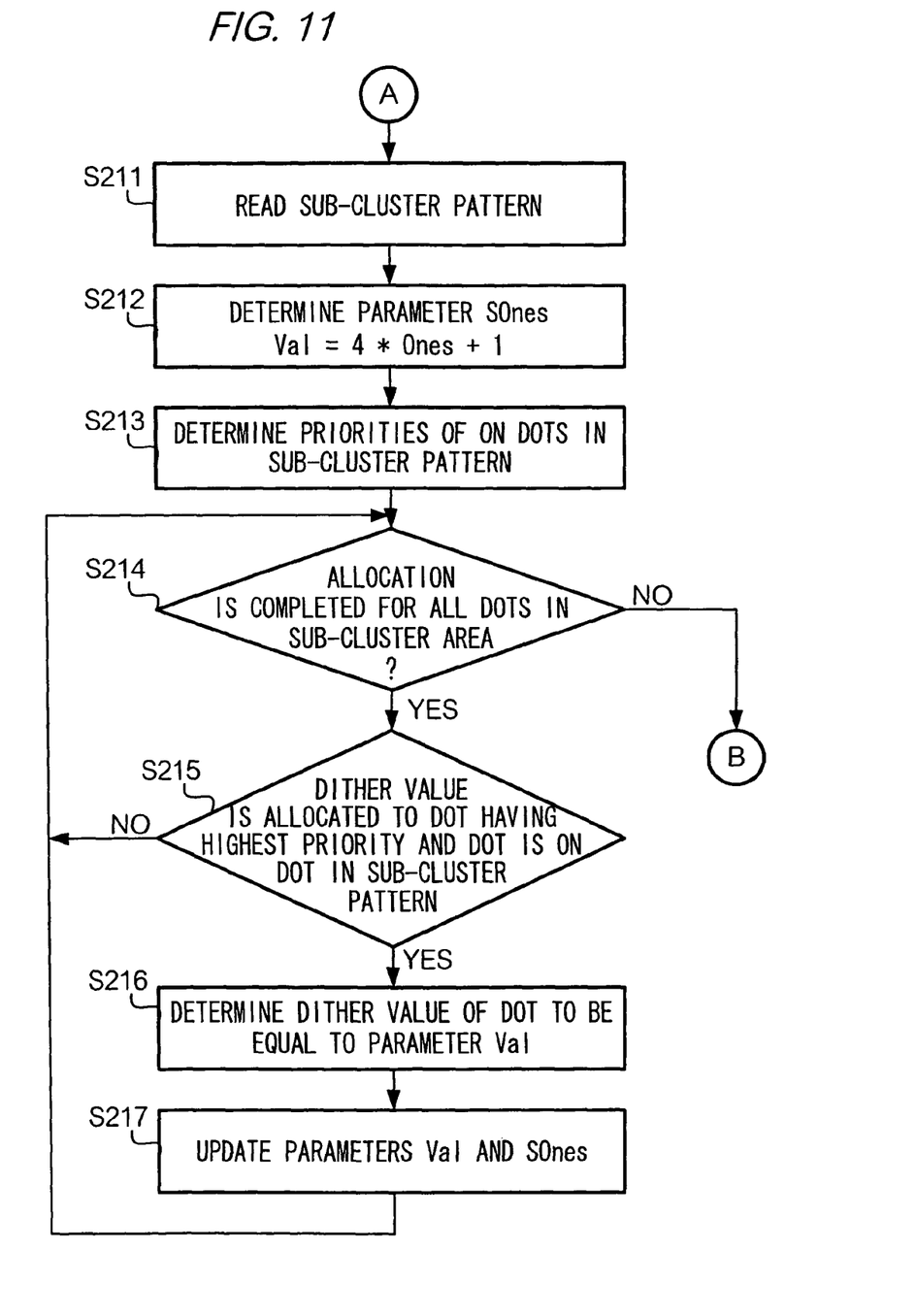
FIG. 11 is a flowchart showing further details of the step of allocating dither values in accordance with one embodiment of the invention.
Figure 12:
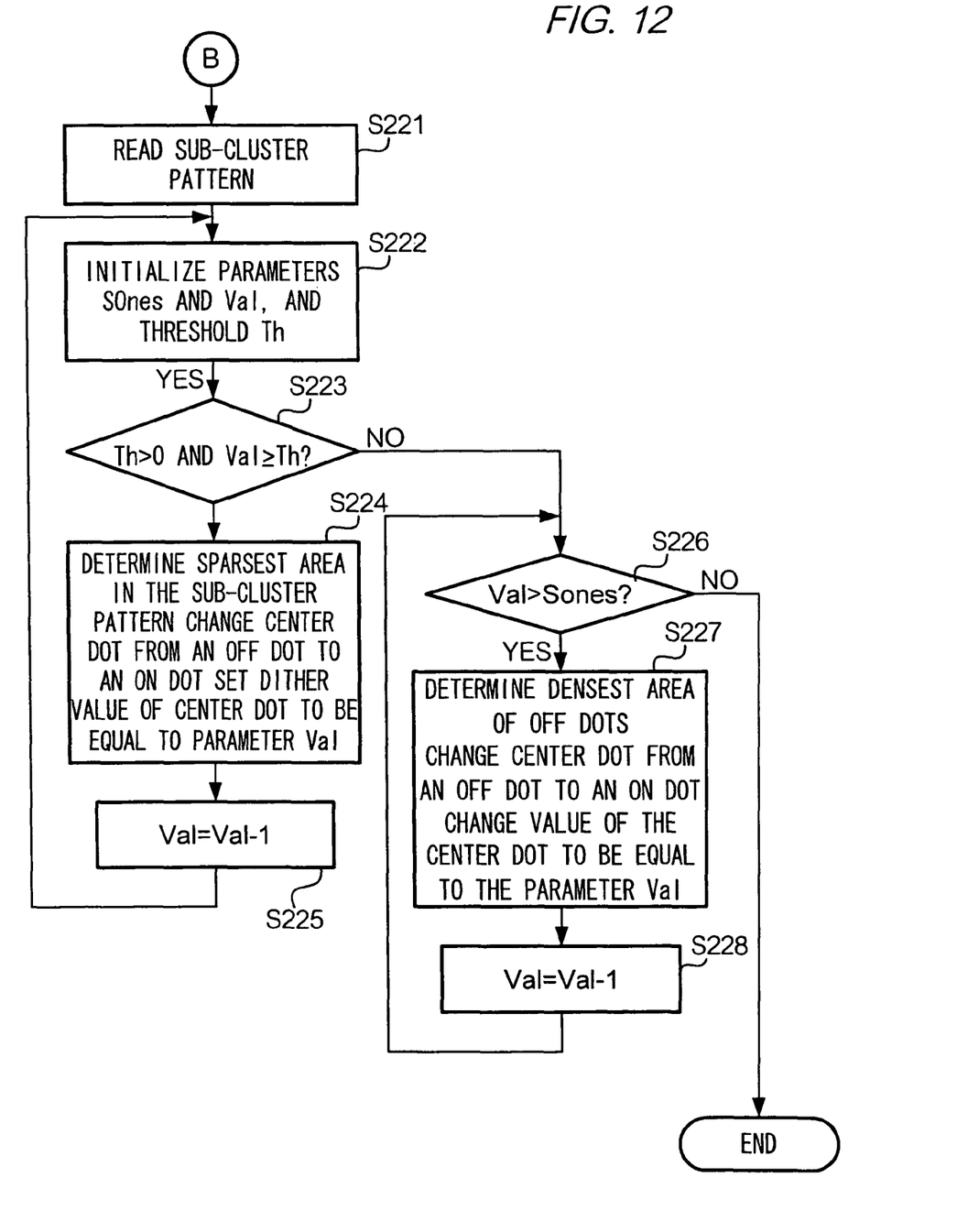
FIG. 12 is a flowchart showing still further details of the step of allocating dither values in accordance with one embodiment of the invention.

FIGS. 10-12 show details of the allocation of dither values in step S170. As shown in FIGS. 10-12, different algorithms are used for the main-clusters, the sub-clusters, and the dispersed dither area.

First, allocation for the main-clusters is described. In step S201, the CPU 110 reads out the blue noise pattern (shown in FIG. 6) from HDD 150 to RAM 130. In step S202, the CPU 110 sets the value of a parameter Ones to the number of ON dots in the blue noise pattern. The present embodiment shows an example of Ones=4. Also, in step S202, the CPU initializes a parameter Val. In this case, the parameter Val is initialized as Val=1. In step S203, the CPU 110 determines the priorities (or ranks) of the ON dots (or product nuclei), on the basis of the density of the ON dots. In step S204, the CPU 110 determines whether the allocation is completed for all the dots in the main-clusters. In other words, the CPU 110 determines whether the parameter Val satisfies Val≦Ones. Until the parameter Val satisfies Val≦Ones (in step S204: YES), the CPU 110 proceeds to the operation in step S205. When the parameter Val does not satisfy Val≦Ones (in step S204: NO), in other words, when the CPU 110 determines that the allocation is completed for all the dots in the main-clusters, the CPU 110 proceeds to the operation in FIG. 11.

In step S205, the CPU 110 allocates dither values to the dots in the main-clusters, in the order of descending priorities. Details of the allocation are as follow. First, the CPU 110 determines a dither value of a target dot to be equal to the parameter Val. The target dot is a dot having the highest priority among dots that are not yet allocated dither values. The CPU 110 also determines: a dither value of the right adjacent dot of the target dot to be equal to (Val+1); a dither value of the upper-right adjacent dot of the target dot to be equal to (2×Ones+Val); and a dither value of the upper adjacent dot of the target dot to be equal to (2×Ones+Val−1).

Next, in step S206, the CPU 110 updates the parameter Val as Val=Val+1. The CPU 110 repeats the operations of steps S204-S206 until the allocation is completed for all of the dots in the main-clusters. The CPU 110 stores in HDD 150 the matrix including the allocated dither values.

Figure 13:
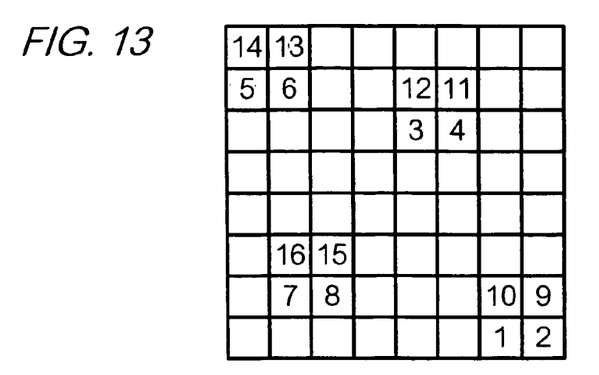
FIG. 13 illustrates an example of the dither values allocated to the main-clusters in accordance with one embodiment of the invention.

FIG. 13 shows an example of the dither values allocated to the main-clusters. As shown in FIG. 13, dither values having smaller values are allocated to the main-clusters. According to the dither value, the probability that a dot is formed at the corresponding location of the main-clusters, is higher than at other areas.

Then, allocation for the sub-cluster area is described with reference to FIG. 11. In step S211, the CPU 110 reads out the sub-cluster pattern from HDD 150 to RAM 130. In step S212, the CPU 110 determines the value of a parameter SOnes to be equal to the number of ON dots in the sub-cluster pattern. Furthermore, the CPU 110 initializes the parameter Val as Val=NP×Ones+1, the value adding one to the highest dither value in the main-clusters. In the present embodiment, The initial value of the parameter Val is determined as Val=17 since NP=4 and Ones=4.

In step S213, the CPU 110 determines the priorities (or ranks) of the ON dots in the sub-cluster pattern, on the basis of the density of the ON dots. In step S214, CPU 110 determines whether the allocation is completed for all the dots in the sub-cluster area. In other words, the CPU 110 determines whether the parameter SOnes satisfies SOnes>0. Until the parameter SOnes satisfies SOnes>0 (in step S214: YES), the CPU 110 proceeds to the operation in step S215. When the parameter SOnes does not satisfy SOnes>0 (in step S214: NO), in other words, when the CPU 110 determines that the allocation is completed for all the dots in the sub-cluster area, the CPU 110 proceeds to the operation in FIG. 12.

In step S215, the CPU 110 determines whether the dot having the highest priority in step S213 is a dot that belongs to the sub-cluster area. In other words, the CPU 110 determines whether a dither value is allocated to the dot having the highest priority and the dot is an ON dot in the sub-cluster pattern. When the dot is determined to be in the sub-cluster areas (in step S215: YES), in step S216, the CPU 110 determines a dither value of the dot to be equal to the parameter Val. In step S217, the CPU 110 updates the parameters Val and SOnes, and the priorities of the dot in the sub-cluster pattern. Specifically, the CPU 110 updates the parameters Val and SOnes as Val=Val+1 and SOnes=SOnes−1. Furthermore, the CPU 110 decreases the priority of the dot having the highest priority so that the priority of the dot be the lowest, and increases by one the priority of the other dots. The CPU 110 repeats the operations of steps S214-S217 until the operations are completed for all the dots in the sub-cluster areas.

When the dot is determined to be not in the sub-cluster areas (in step S215: NO), the CPU 110 updates the priorities of the dots as described above. Then, the CPU 110 proceeds to the operation in step S214.

Figure 14:
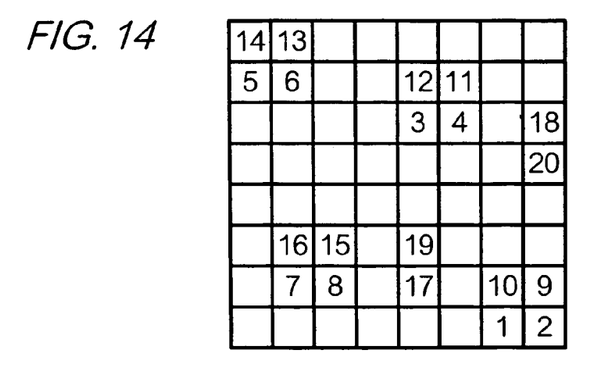
FIG. 14 illustrates an example of the dither values allocated to the main-cluster and the sub-cluster areas in accordance with one embodiment of the invention.

FIG. 14 shows an example of the dither values allocated to the main-cluster and the sub-cluster areas. In one sub-cluster area, there is no correlation between the dots since the dither values are allocated on the basis of the priority.

Then, allocation for the dispersed dither area is described with reference to FIG. 12. In step S221, the CPU 110 reads out the sub-cluster pattern from HDD 150 to RAM 130. In step S222, the CPU 110 initializes parameters SOnes and Val, and Threshold Th. Specifically, the CPU 110 sets the value of the parameter SOnes as the number of ON dots in the sub-cluster pattern. Also, the CPU 110 sets the value of the parameter Val as the maximum dither value (or the matrix size M×N). Furthermore, the CPU 110 sets the value of Threshold Th as follows.

In a case of SOnes<(Val/2), the CPU 110 sets the Threshold Th as Th=Val/2

In a case of (Val/2)<SOnes<(3 Val/4), the CPU 110 sets the Threshold Th as Th=3 Val/4

In other cases, the CPU 110 sets the Threshold Th as Th=0.

In step S223, the CPU 110 determines whether the Threshold Th and the parameter Val satisfy predetermined conditions, Th>0 and Val≧Th. In a case of Th>0 and Val≧Th (in step S223: YES), the CPU 110 proceeds to the operation in step S224. In step S224, the CPU 110 determines the sparsest area in the sub-cluster pattern. The CPU 110 updates the value of the center dot from "0" to "1", in other words, the CPU 110 changes the center dot from an OFF dot to an ON dot. Furthermore, the CPU 110 sets the dither value of the center dot as being equal to the parameter Val. In step S225, the CPU 110 updates the value of the parameter Val by decreasing one, as Val=Val−1. The CPU 110 repeats the operations of steps S224-S225 until the parameter Val and the threshold Th satisfy the conditions.

In a case that the parameter Val and the threshold Th do not satisfy the conditions of Th>0 and Val≧Th (in step S223: NO), in other words, in a case of Val<Th, the CPU 110 proceeds to the operation in step S226. In step S226, the CPU 110 determines whether the parameters Val and SOnes satisfy a predetermined condition, Val>SOnes. When the parameters Val and SOnes satisfy Val>SOnes (in step S226: YES), the CPU 110 proceeds to the operation in step S227. In step S227, the CPU 110 determines the densest area of OFF dots (here, the "densest area" is an area at which the density of the OFF dot is the highest). Then, the CPU 110 changes the value of the center dot of the densest area from "0" to "1", in other words, the CPU 110 changes the center dot from an OFF dot to an ON dot. Also, the CPU 110 changes the value of the center dot so as to be equal to the parameter Val. In step S228, the CPU 110 updates the value of the parameter Val by decreasing one to Val=Val−1. The CPU 110 repeats the operations of steps S227-S228 until the parameters Val and SOnes satisfy the condition. When the parameters Val and SOnes do not satisfy the condition Val>SOnes (in step S226: NO), the CPU 110 terminates the operations in FIG. 12.

As described above, the allocation of the dither value to the dispersed dither area is performed in two stages. According to the two stage operations, the convergence properties are increased because the densest area of OFF dots is determined when the number of OFF dots is greater than that of ON dots, and the densest area of OFF dots is determined when the number of ON dots is greater than that of OFF dots. Furthermore, in the allocation of the dither value to the dispersed dither area, the initial value of the parameter Val is the maximum dither value. According to the initial value, dots are likely to be formed on the periphery of the main-clusters and the sub-clusters. Thus, in the dispersed dither area, a greater dither value is allocated to a dot having a longer distance from the main clusters and the sub-clusters.

Figure 15:
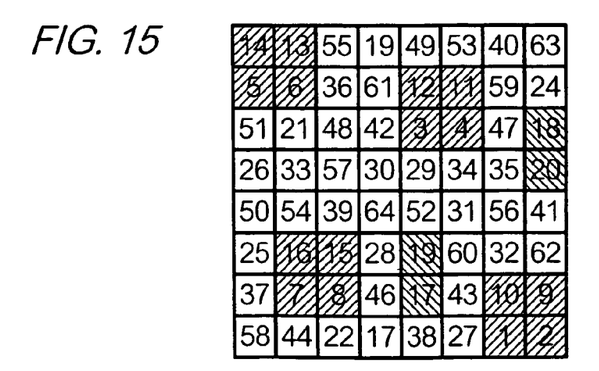
FIG. 15 illustrates an example of a Hybrid Dither Matrix with Sub-cluster in accordance with one embodiment of the invention.

FIG. 15 shows an example of the HDMS generated by the method described above. In FIG. 15, the main-clusters, the sub-clusters, and the dispersed dither area are distinguished by hatching.

Furthermore, the CPU 110 generates a dither matrix having a larger size than the HDMS. The dither matrix includes a plurality of HDMSs. In the dither matrix, the plurality of HDMSs are laid-out by shifting two adjacent HDMSs in x direction or y direction. According to the shift, the basic angle of the main cluster can be nearly 45 degrees. This is because it is well-known that the basic angle of 45 degrees provides a high visual quality of the image. The CPU 110 controls the display 170 to display the dither matrix including a plurality of HDMSs. The CPU 110 may change the shift amount in response to the operation of the keyboard by a user. The CPU 110 may control the display of the dither matrix with different areas being identical, for example, by using different colors. Although the halfway results (for example, the main-cluster pattern and the sub-cluster pattern) are stored in HDD 150 in the above described embodiment, the halfway results may be stored in RAM 130. It is to be noted that in case of the HDMS, the final result is preferably stored in HDD 150.

3. Image Formation Using the HDMS

Next, an image forming process using the HDMS is described.

Figure 16:
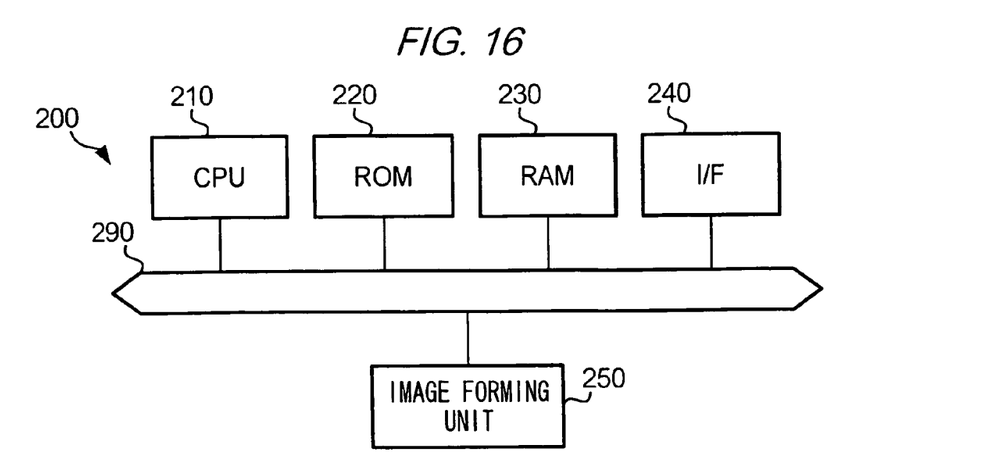
FIG. 16 is a block diagram illustrating a hardware configuration of an image forming device in accordance with one embodiment of the invention.

FIG. 16 shows a block diagram illustrating a hardware configuration of an image forming device 200 in accordance with the present embodiment. In the present embodiment, the image forming device 200 is an ink jet printer with line heads. A CPU 210 executes a printing program stored in a ROM 220. A RAM 230 functions as a work area of the CPU 210. I/F 240 is an interface for inputting and outputting data or signals to other devices, such as a digital still camera or a PC 100. An image forming unit 250 has nozzles, a nozzle driver circuit, and a sheet feeding system (not shown in the drawings). The image forming unit 250 forms an image on a paper (or a sheet) under the control of the CPU 210. The elements are mutually connected via a bus 290. The ROM 220 stores a HDMS generated by the above described method, in advance of the printing.

Figure 17:
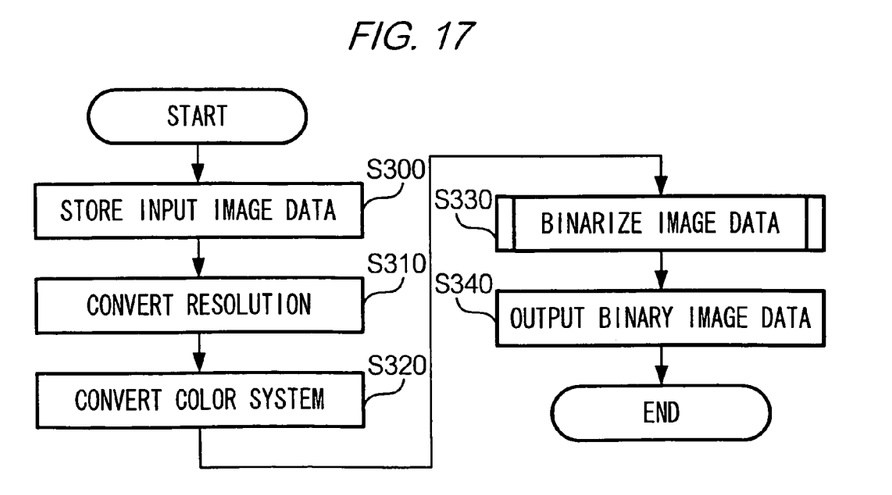
FIG. 17 is a flowchart showing image processing in accordance with one embodiment of the invention.

FIG. 17 shows a flowchart illustrating image processing in accordance with the present embodiment. When the power is turned on, the CPU 210 of the image forming device 200 reads the printing program from the ROM 220 and executes the program. When executing the printing program, the CPU 210 turns into a stand-by state for inputting image data. When receiving image data via the I/F 240, the CPU 210 stores (in step S300) the input image data in RAM 230. In step S310, the CPU 210 converts the resolution of the image into a resolution available in the image forming device 200. In step S320, the CPU 210 converts the color system (for example, RGB) of the image data into a color system (for example; CMYK) available in the image forming device 200. In step S330, the CPU 210 binarizes the image data, using the HDMS stored in ROM 220. In step S340, the CPU 210 outputs the binary image data to the image forming unit 250. Thus, an image is formed on a paper in accordance with the image data. It is to be noted that all or a part of the operations in steps S300-S340 may be performed by another device such as the PC 100.

According to the image forming device 200, the binarization is performed using a hybrid dither matrix having characteristics both of a clustered dither matrix and a dispersed dither matrix. Specifically, the main-clusters prevent banding. Furthermore, the sub-clusters provide improvement in the granularity of the image, by smoothly connecting main-clusters. In the dispersed dither area, in other words, in the area other than the main clusters and the sub-clusters, dots are formed dispersedly.

What is claimed is:

1. A dither matrix generator, comprising:
   a main-cluster generator that generates at least one main-cluster in a matrix, the matrix including a plurality of cells, the main cluster area including a predetermined number of cells;
   a sparsest searcher that searches for a sparsest area in the matrix, the sparsest area being the area other than the area of the main-cluster;
   a sub-cluster generator that generates at least one sub-cluster area in the sparsest area of the matrix, the sub-cluster area including a smaller number of cells than that of the main-cluster, the sub-cluster being generated in a part of the matrix other than that of the main cluster; and
   a dither value allocator that allocates dither values to the plurality of cells of the matrix, the cells in the main-clusters having smaller dither values than those in the sub-cluster areas, the cells in the sub-cluster areas having smaller dither values than those in the areas other than the main-cluster and the sub-cluster areas.

2. A dither matrix generator according to claim 1, wherein the main-cluster generator generates the main-clusters so that the main-clusters are laid-out as a blue noise pattern.

3. A dither matrix generator according to claim 1, wherein the sub-cluster generator generates the sub-cluster areas so that the sub-clusters are laid-out as a blue noise pattern.

4. A dither matrix generator according to claim 1, further comprising:
   a max-sparsest searcher that searches for a max-sparsest area, the max-sparsest area having the maximum size among all sparsest areas,
   wherein the dither value allocator allocates the maximum dither value at that time to a center cell of the max-sparsest area.

5. A print product printed in accordance with image data processed using a dither matrix generated by a dither matrix generator, the dither matrix generator comprising:
   a main-cluster generator that generates at least one main-cluster in a matrix, the matrix including a plurality of cells, the main cluster area including a predetermined number of cells;
   a sparsest searcher that searches for a sparsest area in the matrix, the sparsest area being the area other than that of the main-clusters;
   a sub-cluster generator that generates at least one sub-cluster area in the sparsest area of the matrix, the sub-cluster area including a smaller number of cells than the main-cluster, the sub-cluster being generated in a part of the matrix other than that of the main cluster; and
   a dither value allocator that allocates dither values to the plurality of cells of the matrix, the cells in the main-clusters having smaller dither values than those in the sub-cluster areas, the cells in the sub-cluster areas having smaller dither values than those in the areas other than the main-cluster and the sub-cluster areas.

6. A method for generating a dither matrix, comprising:
   generating, by a processor, at least one main-cluster in a matrix, the matrix including a plurality of cells, the main cluster area including a predetermined number of cells;
   searching, by the processor, for a sparsest area in the matrix, the sparsest area being the area other than that of the main-cluster;
   generating, by the processor, at least one sub-cluster area in the sparsest area of the matrix, the sub-cluster area including a smaller number of cells than the main-cluster, the sub-cluster being generated in a part of the matrix other than that of the main cluster; and
   allocating, by the processor, dither values to the plurality of cells of the matrix, the cells in the main-clusters having smaller dither values than those in the sub-cluster areas, the cells in the sub-cluster areas having smaller dither values than those in the areas other than the main-cluster and the sub-cluster areas.

7. A computer readable medium storing a program causing a computer device having a processor to execute a process, the process comprising:
   generating, by the processor, at least one main-cluster in a matrix, the matrix including a plurality of cells, the main cluster area including a predetermined number of cells;
   searching, by the processor, for a sparsest area in the matrix, the sparsest area being the area other than that of the main-cluster;
   generating, by the processor, at least one sub-cluster area in the sparsest area of the matrix, the sub-cluster area including a smaller number of cells than the main-cluster, the sub-cluster being generated in a part of the matrix other than that of the main cluster; and
   allocating, by the processor, dither values to the plurality of cells of the matrix, the cells in the main-clusters having smaller dither values than those in the sub-cluster areas, the cells in the sub-cluster areas having smaller dither values than those in the areas other than the main-cluster and the sub-cluster areas.

8. An image processing device, comprising:
   a memory that stores a dither matrix, the matrix including a plurality of cells, each of the cells having a dither value;
   a quantizer that quantizes image data using the dither matrix stored in the memory; and
   an output device that outputs the image data quantized by the quantizer;

wherein the dither matrix includes clustered dither areas and dispersed dither areas, the clustered dither areas having main-clusters and a sub-cluster area, the sub-cluster area being in a sparsest area of the matrix and having a size smaller than that of the main-clusters, cells in the main-clusters having smaller dither values than those in the sub-cluster areas, the cells in the sub-cluster areas having smaller dither values than those in the areas other than the main-cluster and the sub-cluster areas, the sub-cluster being generated in a part of the matrix other than that of the main cluster.

9. An image processing device according to claim 8, wherein the main-cluster generator generates the main-clusters so that the main-clusters are laid-out as a blue noise pattern.

10. An image processing device according to claim 8, wherein the sub-cluster generator generates the sub-cluster areas so that the sub-clusters are laid-out as a blue noise pattern.

* * * * *